9256X
E. P. Fitzpatrick.
Screw for Propelling Boats.
Patented Nov. 23, 1835.
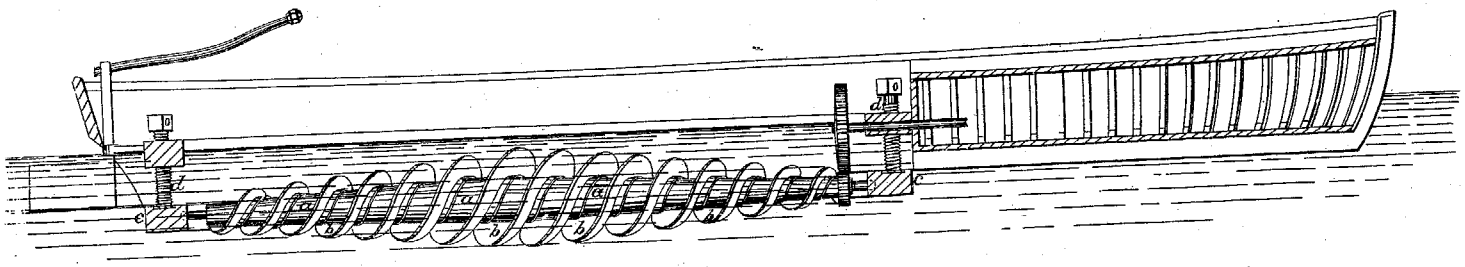
N. PETERS, PHOTO-LITHOGRAPHER, WASHINGTON, D. C.

Edward P. FitzPatrick of Mount Morris New York

Letters Patent.

The Schedule referred to in these Letters Patent and making part of the same containing a description in the words of the said Edward P. Fitzpatrick of his improvement in the Screw for propelling Boats.

To all to whom these presents shall come. Be it known that I Edward P. Fitz Patrick of Mount Morris in the County of Livingston and State of New York, have invented a new and useful improvement in the manner of constructing "the spiral screw for propelling Boats" and that the following is a full and exact description of the construction and mode of operation of the said improvement as invented by me. I would premise that a great object to be obtained by [illegible] this manner of construction is that there is little or no ripple produced by the motion of the screw through the water which will be found to be a great advantage in the Navigation of Canals as it will thereby prevent any injury to the banks thereof, and on all other occasions where an equal and regular motion is desired either backwards or forwards. In my mode of construction I form the shaft of timber and in some cases hollow being larger in the centre and generally diminishing towards the ends terminating in the point or extremity of the axis. it will thus present the appearance of two cones joined at their bases. Around this I adjust the spiral threads of the screw commencing near the journal at one extremity nearly even with the surface of the shaft so as to rise gradually therefrom in a flat blade towards the centre of the shaft, where at the junction of the bases. the said risings of the blade attain their greatest altitude, and then continue diminishing towards the other end in the same proportion until they terminate there in the same manner as they commenced. This screw so formed I immerse in the water so as to work it below the surface thereof. which I consider essential and for this purpose use a frame in which these journals or extremities of the shaft revolve and apply at the ends a screw so adapted as to raise or depress the said frame in the water according as reason may be found so to do, as in the process of loading or unloading the boat the wheel will require corresponding elevation or depression. it being advisable that it should revolve with its greatest elevation

[illegible]

9256X of the spiral at a few inches below the surface. In some cases several screws may be used. What I claim as my invention and not previously known in the above described improvement and for which I now ask letters Patent is. The manner in which I shape my shaft and spiral screw blade passing round it so as to present the appearance of two cones joined together at their bases. according to the principle above set forth. I would further state, I propose forming the spiral of cast iron so as to be bolted on in sections by means of flanges left for that purpose. In testimony that the above is a full description of the construction and mode of operation of my improvement as invented by me. I have hereunto set my hand this twenty third day of October in the year Eighteen hundred and thirty five Exd. Witnesses — Edw^d P. FitzPatrick WyC — C. H. W. Wharton A. D. Childs Drawing made — (788 words)